Figure 1:
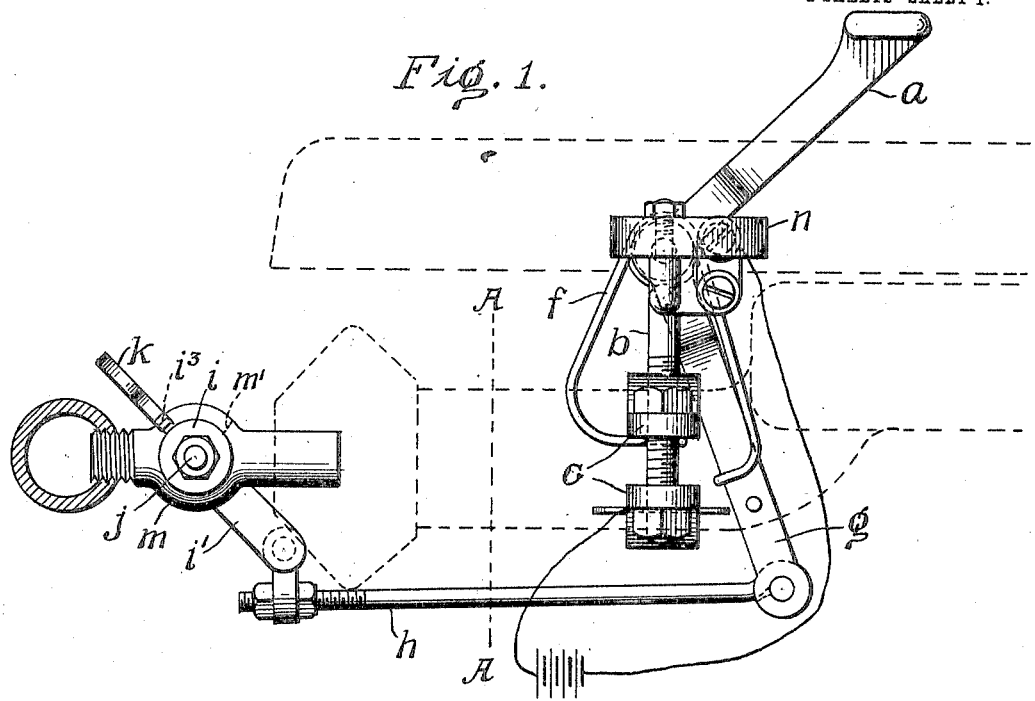

No. 811,959. PATENTED FEB. 6, 1906.
W. B. SCHOFIELD & M. P. OSBOURN.
AUTOMATIC CONTROLLING DEVICE FOR GAS STOVES.
APPLICATION FILED FEB. 27, 1905.

2 SHEETS—SHEET 1.

Witnesses
D. Webster, Jr.
R. M. Kelly

Inventors
William B. Schofield
and Millard P. Osbourn
By
Attorney

No. 811,959. PATENTED FEB. 6, 1906.
W. B. SCHOFIELD & M. P. OSBOURN.
AUTOMATIC CONTROLLING DEVICE FOR GAS STOVES.
APPLICATION FILED FEB. 27, 1905.
2 SHEETS—SHEET 2.
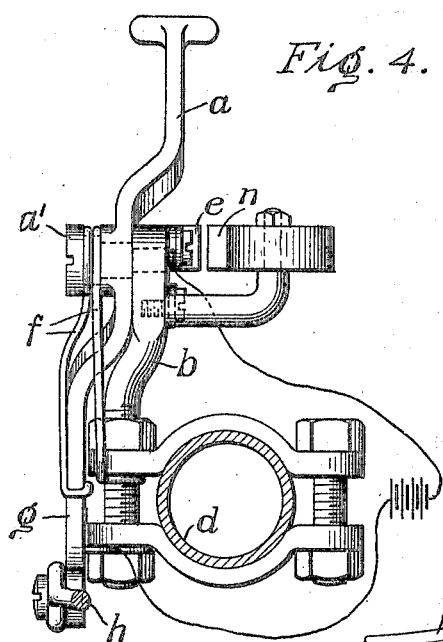
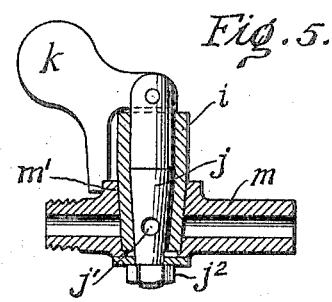
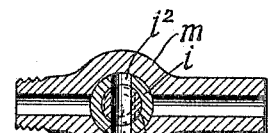
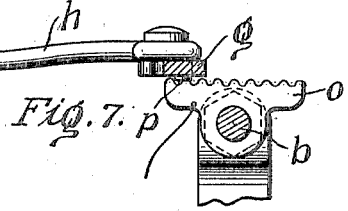
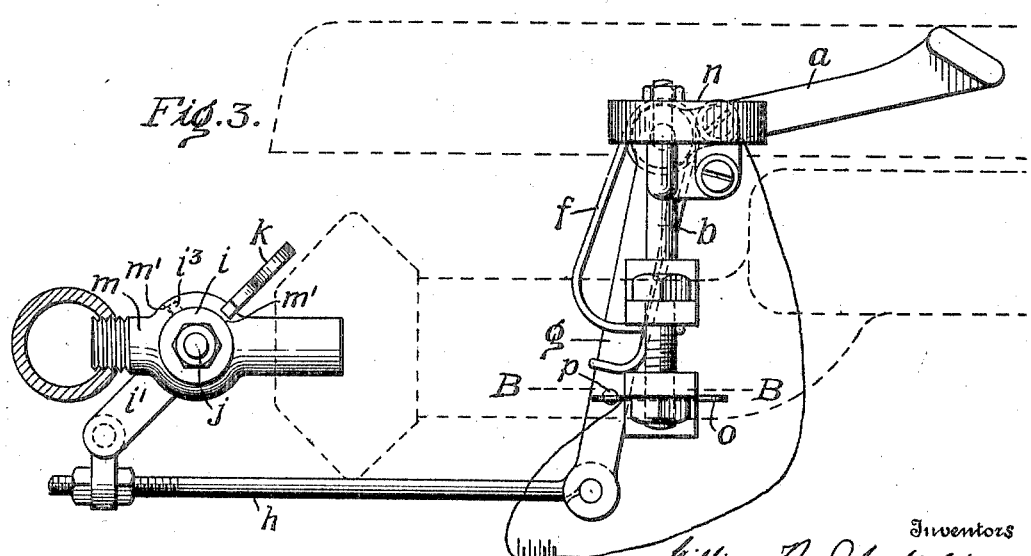

UNITED STATES PATENT OFFICE.

WILLIAM B. SCHOFIELD AND MILLARD P. OSBOURN, OF MERCHANTVILLE, NEW JERSEY.

AUTOMATIC CONTROLLING DEVICE FOR GAS-STOVES.

No. 811,959.  Specification of Letters Patent.  Patented Feb. 6, 1906.

Application filed February 27, 1905. Serial No. 247,503.

*To all whom it may concern:*

Be it known that we, WILLIAM B. SCHOFIELD and MILLARD P. OSBOURN, of Merchantville, county of Camden, and State of New Jersey, have invented an Improvement in Automatic Controlling Devices for Gas-Stoves, of which the following is a specification.

Our invention relates to that form of automatic controlling devices for gas-stoves and the like in which a valve to control the fuel-supply to the burner is operated by a primary actuating device, such as a lever, actuated by a vessel placed upon the stove, whereby the placing of the vessel in position automatically turns on the gas to the burner, and the gas is automatically turned off when the vessel is removed.

It is one of the objects of this invention to embody such automatic controlling devices in an attachment which may be conveniently applied to any ordinary gas-stove without special fittings. In such devices the operation of the primary actuating device turns on the full head of gas; but as less head is often desirable and necessary for proper cooking and economy means should be provided for regulating the fuel-supply at will, and for this purpose we employ an auxiliary hand-operated controlling-valve by which the fuel-supply may be regulated to suit the requirements of the cook without interfering with the automatically-controlled valve, and as it is desirable that the full head should always be turned on at first we provide means whereby the auxiliary hand-controlled controlling-valve will be automatically returned to normal full position with reference to the main automatic valve when that valve is opened or closed. The auxiliary valve which controls the main valve is carried by the latter and moves with it, and if the auxiliary valve has been moved into an intermediate position to reduce the flow of fuel the automatic valve in returning to either open or closed position will move the auxiliary valve back only sufficiently to bring it again into full register with the port of the main automatic valve, so that when the main valve is again actuated by the primary actuating part the full head of gas will be turned on.

Our invention also relates to improvements in the igniting devices, whereby the ignition is rendered more certain and the sparking may be controlled by the flame, so as to continue until the flame has acted thermostatically upon the sparking points.

Figure 2:
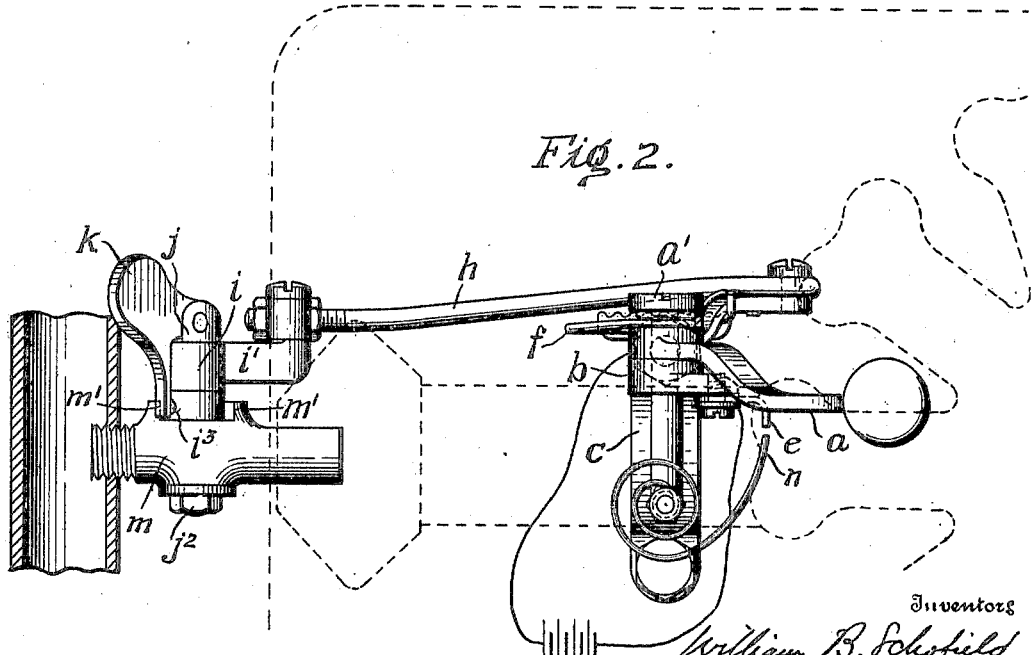

In the drawings, Figure 1 is a side elevation of our automatic gas controlling and igniting devices. Fig. 2 is a plan view of the same. Fig. 3 is a side elevation similar to Fig. 1, but showing the controlling devices after they have been operated to turn out and ignite the gas. Fig. 4 is a vertical section on the line A A of Fig. 1. Figs. 5 and 6 are respectively a vertical and horizontal section of the fuel-controlling valve, and Fig. 7 is a section on the line B B of Fig. 3.

$a$ is the primary actuating device, which, as shown, is a two-armed lever pivoted at $a'$ to a bracket $b$, which carries suitable clamping devices $c\ c'$, by which it may be clamped in place on the gas-stove, as upon the gas-pipe $d$. When the bracket is clamped in place, the upper arm of the lever $a$ projects above the surface of the stove, as shown in Fig. 1. A spring $f$ normally maintains the lever in this position. We have shown a U-shaped spring coiled about the pivot-pin $a'$ and having one end engaging the lever and the other end the bracket; but any suitable spring may be employed.

The lower arm $g$ of the lever $a$ is connected by a rod $h$ with a valve $i$ in the gas-supply pipe, so that when the lever-arm $a$ is depressed by a cooking utensil placed on the stove the lever $a$ is rocked and the valve $i$ is opened to supply the gas to the burner. The valve $i$ is shown as a spindle-valve provided with an arm $i'$, connected with the rod $h$. This operation of the lever $a$ opens the valve $i$ fully and turns on the full head of gas to the burner; but frequently the full head of gas is not required or desirable, and therefore we provide the valve $i$ with an auxiliary controlling-valve by which the head of gas to the burner may be regulated by hand after the automatic valve $i$ has been fully opened.

The spindle-valve $i$ is tubular and has the diametrically opposite ports $i^2\ i^2$, which register with the thoroughfare in the valve-casing when the valve is opened. Within the tubular valve $i$ is a valve-plug $j$, which is free to turn in the tubular valve $i$ and has a port $j'$ normally registering with the ports $i^2\ i^2$. As shown in the drawings, the lower end of the valve-plug $j$ projects through the tubular valve $i$ and casing and is secured in place by a nut $j^2$, and the upper end projects through the top of the valve $i$ and is provided with a handle $k$. On the casing $m$ are limit stops or abutments $m'$ $m'$, and on the valve $i$ is a pin or lug $i^3$, which makes contact with the stops $m'$ $m'$ and limits the movements of the valve $i$. The handle $k$ also makes contact with these stops $m'$ $m'$ and limits the movements of the regulating-valve $j$.

Normally when the gas is turned off the valves $i$ and $j$ are in the position shown in Fig. 1, with the auxiliary controlling-valve $j$ turned so that its handle $k$ is in contact with the stops $m'$, which also acts as the stops for the lug $i'$ of the valve $i$. The ports $i^2$, $j'$, and $i^2$ are then in line with one another, but closed to the gas-thoroughfare, as shown in Fig. 6. When the lever $a$ is rocked by the cooking utensil, the valve $i$ is moved into the position shown in Fig. 3, where it is arrested by the other stop $m'$, and as the valve-plug $j$ is carried by the valve $i$ it will also be moved with the valve $i$. The valve will then occupy the position shown in Fig. 3, and as their relation to one another has not been changed the passage-way through the ports $i^2$ $j'$ $i^2$, which are now in line with the gas-thoroughfare, will be fully opened. It is apparent that by turning the plug $j$ back the port $j'$ may be closed to any extent desired and the supply of gas correspondingly regulated. Whenever the lever $a$ rocks back and closes the valve $i$, the auxiliary regulating-valve will also be carried back until its movement is arrested by the stop $m'$ and the valve $i$ will continue to move until the lug $i^3$ also strikes the stop $m'$. It follows, therefore, that no matter what the adjustment of the regulating-valve may have been that valve will always be brought back into the same relation with the valve $i$ when the latter is closed, and consequently when the valve $i$ is automatically opened the full head of gas will be turned on, which not only aids the ignition, but also assists the regulation by hand, since the cook always starts with a maximum flame, and may then regulate as much as may be desired.

While we prefer the valve devices shown for effecting the hand-control of the gas-supply, we do not mean to limit ourselves to this particular construction, as our invention comprehends broadly the combination, with an automatically-operated main valve controlled by the utensil on the stove to open the gas-supply to the burner, of an auxiliary hand-controlled regulating-valve carried by the main valve to adjust the supply-passage through the main valve.

Suitable automatic igniting devices are provided for igniting the gas when turned on in the manner described, and while any suitable igniting devices may be employed with our improved valve devices we have shown a particular form of igniting devices especially adapted for the purpose. $e$ is a spark-point suitably insulated and carried by the bracket $b$, and $n$ is a second spark-point, also carried by the bracket $b$ and electrically connected, as through the bracket, with a contact-strip $o$, which is arranged to make contact with a pin or contact-point $p$ on the lever-arm $g$ when it is rocked. The contact $o$ and spark-point $e$ are in electrical circuit with the usual exciting-coil. When the lever-arm $g$ passes over the surface of the strip $o$, an interrupted circuit is completed through the spark-points $e$ and $n$. With this arrangement it will be noted that the sparking may be continued for a substantial period and until the lever has completed its movement and turned on the full supply of gas, so that the ignition of the gas is rendered more certain. The circuit may be broken by arranging the contact $o$ so that the lever at the end of its movement will pass out of contact with it; but we prefer to break the circuit by employing a thermostatically-controlled spark-point. For this purpose we have shown the spark-point $n$ in the form of a spiral bimetallic strip secured at one end and so arranged that when heated by the flame its sparking end will move away from the spark point $e$ and out of sparking proximity. With this construction the lever-arm $g$ may be permitted to remain in contact with the strip $o$ while depressed by the cooking utensil and the thermostatic action of the expansible sparking point may alone be relied upon to break the spark, which will not be effected until after the ignition of the gas.

What we claim as new, and desire to secure by Letters Patent, is as follows:

1. In an automatic controlling device for gas-stoves and the like, the combination of a bracket having a clamping device for detachable attachment to the stove, a movable primary actuating device carried by said bracket and adapted to be actuated by the weight of a vessel placed upon it, a valve to control the fuel-supply to the burner, power-transmitting connections between said valve and movable primary actuating device, and igniting devices carried by said bracket and controlled by the movement of said primary actuating device.

2. In an automatic controlling device for gas-stoves and the like, the combination of a movable primary actuating device adapted to be moved by a vessel placed on the stove, valve mechanism to control the fuel-supply to the burner, power-transmitting connections between said valve mechanism and the primary actuating part arranged to fully open the supply to the burner through said valve mechanism, and means manually controlled at will to adjust the supply-opening through said valve mechanism and automatically controlled to return said valve mechanism to full position when the valve passage-way is closed by said power-transmitting connections with the primary actuating part, whereby said valve mechanism, when again operated by the placing of a vessel on the stove, will be fully opened irrespective of the previous adjustment of said means controlled at will.

3. In an automatic controlling device for gas-stoves and the like, the combination of a movable primary actuating device adapted to be moved by a vessel placed on the stove, a main valve to control the fuel-supply to the burner, power-transmitting connections between said main valve and primary actuating part, an auxiliary controlling-valve for independently controlling the fuel-supply when said main valve is opened, and means for automatically returning said auxiliary controlling-valve to full position when the main valve is closed.

4. In an automatic controlling device for gas-stoves and the like, the combination of a movable primary actuating device adapted to be moved by a vessel placed on the stove, a main valve to control the fuel-supply to the burner actuated by said primary actuating device to fully open or close the valve passage-way, and an auxiliary hand-controlled controlling-valve carried by said main valve and adapted to control its valve passage-way.

5. In an automatic controlling device for gas-stoves and the like, the combination of a primary actuating device adapted to be moved by a vessel placed on the stove, a main valve to control the fuel-supply to the burner actuated by said primary actuating device, and an auxiliary controlling-valve carried by said main valve and moving with it, but independently movable with reference to said main valve to control the valve passage-way thereof.

6. In an automatic controlling device for gas-stoves and the like, the combination of a primary actuating device adapted to be moved by a vessel placed on the stove, a main valve to control the fuel-supply to the burner actuated by said primary actuating device, and an auxiliary controlling-valve carried by said main valve and moving with it, but independently movable with reference to said main valve to control the valve passage-way thereof, and means for returning said auxiliary controlling-valve to normal full position with reference to said main valve when the main valve is actuated.

7. In an automatic controlling device for gas-stoves and the like, the combination of a primary actuating device adapted to be moved by a vessel placed on the stove, a tubular valve $i$ located in the fuel-supply pipe and having a port to control the fuel-supply said valve $i$ being actuated by the primary actuating device, and an auxiliary independently-adjustable controlling-valve $j$ carried by said tubular valve $i$ and having a port normally registering with the port of said valve $i$.

8. In an automatic controlling device for gas-stoves and the like, the combination of a primary actuating device adapted to be moved by a vessel placed on the stove, a tubular valve $i$ located in the fuel-supply pipe and having a port to control the fuel-supply said valve $i$ being actuated by the primary actuating device, and an auxiliary independently-adjustable controlling-valve $j$ carried by said tubular valve $i$ and having a port normally registering with the port of said valve $i$, and means to move said controlling-valve with its port in register with the port of the valve $i$ when the latter is moved into open or closed position by the primary actuating device.

9. In an automatic controlling device for gas-stoves and the like, the combination of a primary actuating device adapted to be moved by a vessel placed on the stove, a rotary tubular valve $i$ located in the fuel-supply pipe and having a port to control the fuel-supply, said valve $i$ being actuated by the primary actuating device, stops to limit the movement of said valve $i$ at open and closed positions, an auxiliary independently-adjustable controlling-valve $j$ carried by said tubular valve $i$ and having a port normally registering with the port of said valve $i$, and a projection $k$ carried by said valve $j$ and adapted to strike the limit-stops of the valve $i$ whereby said auxiliary controlling-valve will be automatically returned to position with its port registering with the port of the valve $i$ when said valve is moved into open or closed position by the primary actuating device.

10. In an automatic controlling device for gas-stoves and the like, the combination of a primary actuating device adapted to be moved by a vessel placed on the stove, a valve to control the fuel-supply to the burner actuated by said primary actuating device, and an igniting device arranged adjacent to the burner and controlled by the primary actuating device, said igniting device embracing a thermostatic electric sparking point adapted to move out of sparking proximity when heated by the flame from the burner.

11. In an automatic controlling device for gas-stoves and the like, the combination of a primary actuating device adapted to be moved by a vessel placed on the stove, a valve to control the fuel-supply to the burner actuated by said primary actuating device, a pair of sparking points arranged adjacent to the burner and embraced in a normally open electric circuit, a contact-piece in circuit with the source of electric energy and one of said points and a contact-piece carried by the primary actuating device in circuit with the other sparking point.

12. In an automatic controlling device for gas-stoves and the like, the combination of a primary actuating device adapted to be moved by a vessel placed on the stove, a valve to control the fuel-supply to the burner actuated by said primary actuating device, a pair of sparking points arranged adjacent to the burner and embraced in a normally open electric circuit, a contact-piece in circuit with the source of electric energy and one of said points and a contact-piece carried by the primary actuating device in circuit with the other sparking point one of said sparking points consisting of a thermostatic strip adapted to move out of sparking proximity when heated by the flame from the burner.

In testimony of which invention we have hereunto set our hands.

WILLIAM B. SCHOFIELD.
MILLARD P. OSBOURN.

Witnesses:
R. M. KELLY,
M. J. EYRE.